(12) United States Patent
Uefune et al.

(10) Patent No.: US 8,363,360 B2
(45) Date of Patent: Jan. 29, 2013

(54) DISK DRIVE WITH ADHESIVELY BONDED PIVOT-BEARING ASSEMBLY

(75) Inventors: Kouki Uefune, Kanagawa (JP); Takashi Kouno, Ibaraki (JP); Takako Hayakawa, Kanagawa (JP); Kazuhide Ichikawa, Kanagawa (JP)

(73) Assignee: HGST, Netherlands B.V., Amsterdam (NL)

( * ) Notice: Subject to any disclaimer, the term of this patent is extended or adjusted under 35 U.S.C. 154(b) by 300 days.

(21) Appl. No.: 12/784,384

(22) Filed: May 20, 2010

(65) Prior Publication Data
US 2010/0296197 A1    Nov. 25, 2010

(51) Int. Cl.
*G11B 5/55* (2006.01)
(52) U.S. Cl. .................................. 360/265.6; 384/537
(58) Field of Classification Search ............... 360/265.2, 360/265.4, 265.5, 265.6, 98.07, 99.08; 384/295, 384/537, 617
See application file for complete search history.

(56) References Cited

U.S. PATENT DOCUMENTS

| 5,146,450 | A | * | 9/1992 | Brooks et al. | 360/265.6 |
| 5,914,837 | A | * | 6/1999 | Edwards et al. | 360/265.6 |
| 6,038,105 | A | | 3/2000 | Wood et al. | |
| 6,519,116 | B1 | | 2/2003 | Lin et al. | |
| 8,144,434 | B1 | * | 3/2012 | Arnone et al. | 360/265.6 |
| 2003/0156773 | A1 | * | 8/2003 | Tsuchiya et al. | 384/537 |
| 2005/0213255 | A1 | * | 9/2005 | Deguchi et al. | 360/265.2 |
| 2006/0024504 | A1 | * | 2/2006 | Nelson et al. | 428/409 |
| 2007/0291417 | A1 | * | 12/2007 | Woodhead et al. | 360/265.2 |

FOREIGN PATENT DOCUMENTS

| JP | 2002106586 | 4/2002 |
| JP | 2002367304 | 12/2002 |
| JP | 2006190356 | 7/2006 |

* cited by examiner

*Primary Examiner* — Jefferson Evans

(57) ABSTRACT

A disk drive includes a head for accessing a disk, a suspension for supporting the head, a carriage coupled to the suspension, a pivot-bearing assembly, an adhesive, and an adhesion inhibitor. The pivot-bearing assembly is housed in a hole of the carriage that is configured to rotate in such a way that the carriage is configured to oscillate. The adhesive is disposed between the pivot-bearing assembly and an inner circumferential surface of the hole for bonding the pivot-bearing assembly with the carriage. The adhesion inhibitor is disposed on the same surface as the adhesive for controlling a region of adhesion.

11 Claims, 8 Drawing Sheets

2

DISK DRIVE WITH ADHESIVELY BONDED PIVOT-BEARING ASSEMBLY

CROSS-REFERENCE TO RELATED APPLICATION

This application claims priority from the Japanese Patent Application No. 2009-122599, filed May 20, 2009, the disclosure of which is incorporated herein in its entirety by reference.

TECHNICAL FIELD

Embodiments of the present invention relate to a disk drive, and more particularly to the means for affixing a pivot-bearing assembly and a carriage of a disk drive.

BACKGROUND

A number of disk drives using a range of recording-disk types including optical disks, magneto-optical disks, and flexible magnetic-recording disks are available. These disk drives also include HDDs which are widely employed in computers as data-storage devices, and which are indispensable in existing computer systems. Furthermore, because of the superior characteristics of HDDs, the use of a HDD is not limited to computer systems, and the use of HDDs has been expanded to include video image recording and reproduction apparatuses, and car navigation systems.

A HDD includes a magnetic-recording disk for storing data, a head-slider for reading form, and/or writing data to, the magnetic-recording disk, and an actuator for moving the head-slider to a designated position on the magnetic-recording disk. The actuator is driven by a voice-coil motor (VCM), and oscillates about a pivot shaft. As a result, the actuator causes the head-slider to move over the rotating magnetic-recording disk in substantially the radial direction of the magnetic-recording disk.

The head-slider is able to be moved to a designated track on the magnetic-recording disk, and data processing is able to be performed by reading data from, or writing data to, this track. The head-slider includes a magnetic-recording head for performing data processing by reading data from, or writing data to, the track. The actuator includes an elastic suspension, and the head-slider is fastened to the suspension.

The head-slider is able to fly over the magnetic-recording disk at a predetermined fly height between the head-slider and the magnetic-recording disk due to the balance that exists between the pressure generated by the viscosity of the air between the rotating magnetic-recording disk and the air-bearing surface (ABS) of the slider opposing the magnetic-recording disk, and a load that is applied by the suspension towards the surface of the magnetic-recording disk. The suspension is fabricated to allow the slider to track across the surface of the magnetic-recording disk in such a way that the slider is able to be tilted in a predetermined direction in order to compensate for magnetic-recording disk runout and other factors.

The actuator typically includes a carriage, which is also known as an E-core or comb, which includes a VCM coil and one arm, or a plurality of arms, a head-gimbal assembly (HGA) affixed to the distal end of the arm, or arms, and a pivot-bearing assembly affixed within a hole disposed in the center of the carriage. The HGA includes the suspension and the head-slider. The actuator oscillates about the pivot-bearing assembly as a result of a driving force applied by the VCM coil.

Increased HDD recording density has been accompanied by increased track density and further increased positioning precision. Increasing the track density, which may be obtained by narrowing the track interval, has lead to widening the head positioning control bandwidth. To do this, the head-slider is supported, and the bandwidth of the actuator for moving the head-slider is widened. To widen the bandwidth of the actuator, reducing actuator vibration characteristics is useful for increasing HDD performance.

SUMMARY

Embodiments of the present invention include a disk drive. The disk drive includes a head for accessing a disk, a suspension for supporting the head, a carriage coupled to the suspension, a pivot-bearing assembly, an adhesive, and an adhesion inhibitor. The pivot-bearing assembly is housed in a hole of the carriage that is configured to rotate in such a way that the carriage is configured to oscillate. The adhesive is disposed between the pivot-bearing assembly and an inner circumferential surface of the hole for bonding the pivot-bearing assembly with the carriage. The adhesion inhibitor is disposed on the same surface as the adhesive for controlling a region of adhesion.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
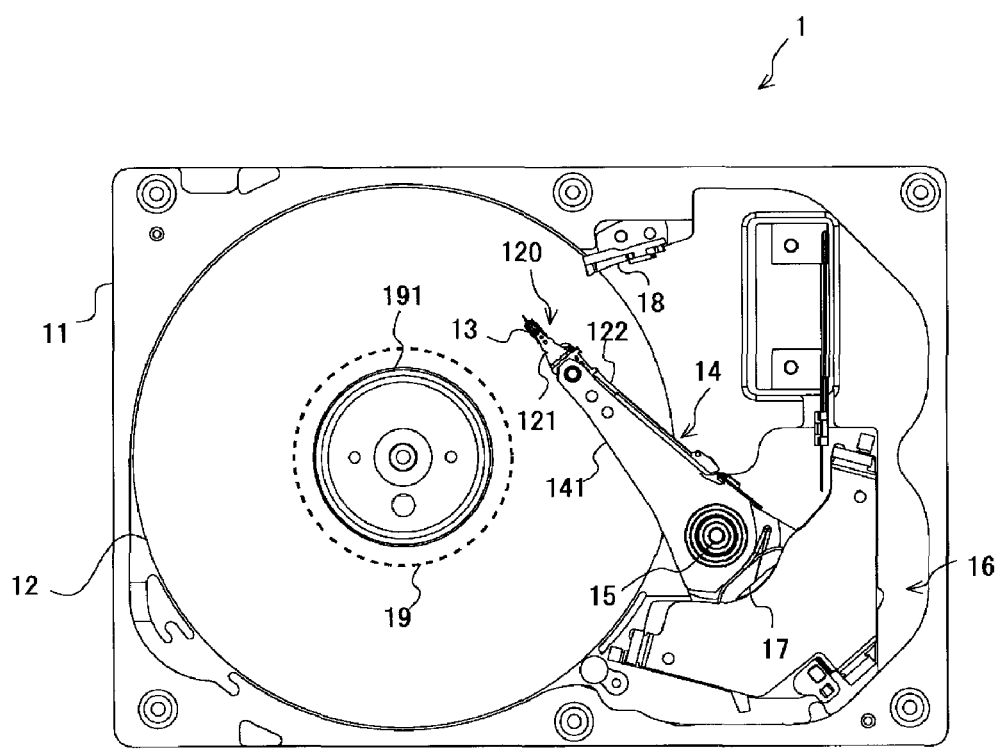
FIG. 1 is a schematic plan view illustrating the component parts of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive with an Adhesively Bonded Pivot-Bearing Assembly With relevance for embodiments of the present invention, the actuator vibration characteristics may be effectively reduced by reducing the weight of the carriage and increasing the rigidity of the carriage, and by increasing the rigidity of the pivot-bearing assembly. Weight reduction of the carriage may be achieved by the fabrication of the carriage from an aluminum alloy or magnesium alloy. On the other hand, increased rigidity of the pivot-bearing assembly may be achieved by the fabrication of the pivot-bearing assembly from a bearing steel or stainless steel. In this way, the pivot-bearing assembly and carriage are fabricated from different metals and have different coefficients of linear expansion. More specifically, the coefficient of linear expansion of the carriage is greater than the coefficient of linear expansion of the pivot-bearing assembly.

For this reason, when the pivot-bearing assembly is directly affixed to the carriage, the actuator vibration characteristics deteriorate as a result of the deformation of the pivot-bearing assembly caused by temperature change. As is known in the art, a technique for reducing deterioration of actuator vibration characteristics caused by thermal deformation is based on the insertion of a prescribed pivot sleeve between the pivot-bearing assembly and the carriage.

To reduce the actuator vibration characteristics, the pivot-bearing assembly is securely affixed to the carriage. In an embodiment of the present invention, this affixing of the pivot-bearing assembly and carriage is achieved using an adhesive. However, when the pivot-bearing assembly and carriage are fastened using an adhesive in the manner described above, thermal deformation of the actuator caused by a difference in the coefficients of linear expansion of the pivot-bearing assembly and carriage results in both deformation of the bearing outer ring and changes in the preload on the pivot bearing. The resultant change in rigidity of the pivot bearing gives rise to deteriorated vibration characteristics. Accordingly, embodiments of the present invention provide a method for affixing the pivot-bearing assembly to the carriage based on the use of an adhesive and that is able to alleviate deterioration of actuator vibration characteristics caused by temperature change.

The disk drive according to one embodiment of the present invention includes: a head for accessing a disk; a suspension for supporting the head; a carriage coupled to the suspension; a pivot-bearing assembly housed in a hole of the carriage that is configured to rotate in such a way that the carriage is configured to oscillate; an adhesive adhered between the pivot-bearing assembly and the inner circumferential surface of the hole for bonding the pivot-bearing assembly with the carriage; and an adhesion inhibitor disposed on the same surface as the adhesive for controlling the region of adhesion. Thus, in accordance with embodiments of the present invention, the region of adhesion of the pivot-bearing assembly on the carriage is able to be effectively controlled.

In an embodiment of the present invention, the adhesion inhibitor is a fluoride-based water repellent and/or oil-repellent agent able to repel the adhesive. Thus, in accordance with embodiments of the present invention, the region of adhesion is able to be more effectively controlled, and the occurrence of errors in a disk drive that are caused by an adhesive is able to be suppressed.

In an embodiment of the present invention, the adhesive is adhered between the bearing outer ring of the pivot-bearing assembly and the inner circumferential surface of the hole. Accordingly, the vibration characteristics are able to be reduced. Furthermore, in one embodiment of the present invention, the coefficient of linear expansion of the outer ring is less than the coefficient of linear expansion of the carriage; and, in another embodiment of the present invention, the angle between the direction of preload on the bearing and the direction of tensile force in the region of adhesion caused by temperature rise is no less than 45°. Accordingly, the thermal deformation effect on the bearing characteristics can be effectively minimized. Furthermore, in an embodiment of the present invention, the region of adhesion where the outer ring and the inner circumferential surface of the hole are bonded extends across the outer circumferential surface of the outer ring. Thus, in accordance with embodiments of the present invention, a more secure adhesive affixing is provided based on a more efficient treatment.

In an embodiment of the present invention, the pivot-bearing assembly includes at least two bearings disposed in the axial direction, wherein an outer ring of an upper bearing of the pivot-bearing assembly and the inner circumferential surface of the hole are bonded at an upper region of adhesion and an outer ring of a lower bearing of the pivot-bearing assembly and the inner circumferential surface of the hole are bonded at a lower region of adhesion separate from the upper region of adhesion; the upper region of adhesion extends to the upper end of the pivot-bearing assembly; and the lower region of adhesion extends to the lower edge of the pivot-bearing assembly. Thus, in accordance with embodiments of the present invention, the disk drive is able to be efficiently manufactured.

Furthermore, in one embodiment of the present invention, the upper region of adhesion and lower region of adhesion extend across the outer circumferential surface of the pivot-bearing assembly. Thus, in accordance with embodiments of the present invention, a more secure adhesive affixing is provided based on a more efficient treatment. Furthermore, in another embodiment of the present invention, the coefficient of linear expansion of the outer ring is less than the coefficient of linear expansion of the carriage; and, in another embodiment of the present invention, the angle between the direction of preload on the bearing and the direction of tensile force in the region of adhesion caused by temperature rise is no less than 45°. Thus, in accordance with embodiments of the present invention, the effects of thermal deformation on the characteristics of the bearing are able to be effectively minimized.

In an embodiment of the present invention, a region of the outer circumferential surface of the pivot-bearing assembly incorporating a section where the oscillation direction defines a normal line constitutes a region of non-adhesion, while a region of the pivot-bearing assembly incorporating a section where a line connecting the head and the center of the pivot shaft defines a normal line constitutes a region of adhesion. Thus, in accordance with embodiments of the present invention, the effects of thermal deformation on the characteristics of the bearing are able to be effectively minimized.

In one embodiment of the present invention, the pivot-bearing assembly includes a spacer between two bearings disposed in the axial direction; and, in another embodiment of the present invention, the outer circumferential surface of the spacer is covered by the adhesion inhibitor. Thus, in accordance with embodiments of the present invention, the likelihood of deterioration in the vibration characteristics is able to be minimized. Moreover, in accordance with embodiments of the present invention, the region of adhesion of the pivot-bearing assembly on the carriage is able to be effectively controlled.

As one example of a type of disk drive, a HDD is subsequently described. In the HDD, a pivot-bearing assembly is affixed within a hole disposed in a carriage by means of an adhesive. Accordingly, the pivot-bearing assembly is able to be securely affixed to the carriage; and, in turn, the actuator vibration characteristics are able to be enhanced. In addition, in this type of disk drive, an adhesion inhibitor for inhibiting the adhesion of the adhesive is used to control the region of adhesion of the pivot-bearing assembly. Thus, in accordance with embodiments of the present invention, deformation of the pivot-bearing assembly caused by the thermal deformation of the actuator is able to be suppressed; and, deterioration in the actuator vibration characteristics associated with temperature change is able to be suppressed.

With reference now to FIG. 1, in accordance with embodiments of the present invention, a schematic plan view is shown that illustrates the component parts of HDD 1. HDD 1 includes one or a plurality of magnetic-recording disks 12 arranged in a stack disposed on a base 11 which provides a portion of a frame body for HDD 1. A spindle motor (SPM) 19 rotates the magnetic-recording disk 12 on which data is to be stored. The magnetic-recording disk 12 is affixed to the SPM 19 by a top clamp 191. An opening in the base 11 is covered by a top cover (not shown). Data is able to be stored on one or both sides of the magnetic-recording disk 12.

A head-slider 13 serving as a head for accessing a magnetic-recording disk 12 is supported in proximity to the distal end of an actuator 14. As used herein, "access" is a term of art that refers to operations in seeking a data track of the magnetic-recording disk 12 and positioning a magnetic-recording head, which is included in the head-slider 13, on the data track for both reading data from, and writing data to, the magnetic-recording disk 12. The actuator 14 is affixed to a pivot-bearing assembly 15 and, in order to ensure the head-slider 13 is able to access the magnetic-recording disk 12, the head-slider 13 is oscillated in substantially the radial direction of the magnetic-recording disk 12. The actuator 14 includes an arm 141, and a head-gimbal assembly (HGA) 120 coupled to the arm 141. The HGA 120 includes the head-slider 13 and a suspension 121 with spring characteristics for supporting the head-slider 13.

The suspension 121 functions as a spring able to generate a load that counterbalances the lift applied to the head-slider 13. The head-slider flies above the magnetic-recording disk 12 due to the balance between the lift from the pressure generated by the viscosity of the air between the ABS of the slider and the rotating magnetic-recording disk 12 and the load applied by the suspension the head-slider 13. When the magnetic-recording disk 12 stops rotating, the actuator 14 lies stationary on a ramp 18 above the magnetic-recording disk 12. Notably, the contact start/stop (CSS) system, which is a system known in the art that is employed for movement across the inner circumferential region of the magnetic-recording disk 12, is applied to the HDD of this embodiment of the present invention.

A VCM coil 17 is disposed on the opposite side of the arm 141 about the pivot-bearing assembly 15. A VCM 16 oscillates the actuator 14 about a pivot shaft of the pivot-bearing assembly 15 in response to a drive signal applied to the VCM coil 17. As a result of the movement of the head-slider 13 along the radial direction of the surface of the magnetic-recording disk 12 by the actuator 14, the head-slider 13, which includes a magnetic-recording head, is able to access the designated track. The operational control and signal processing of HDD 1 are executed by a control circuit of a control circuit board (not shown) mounted on a rear surface of the base 11.

Figure 2:
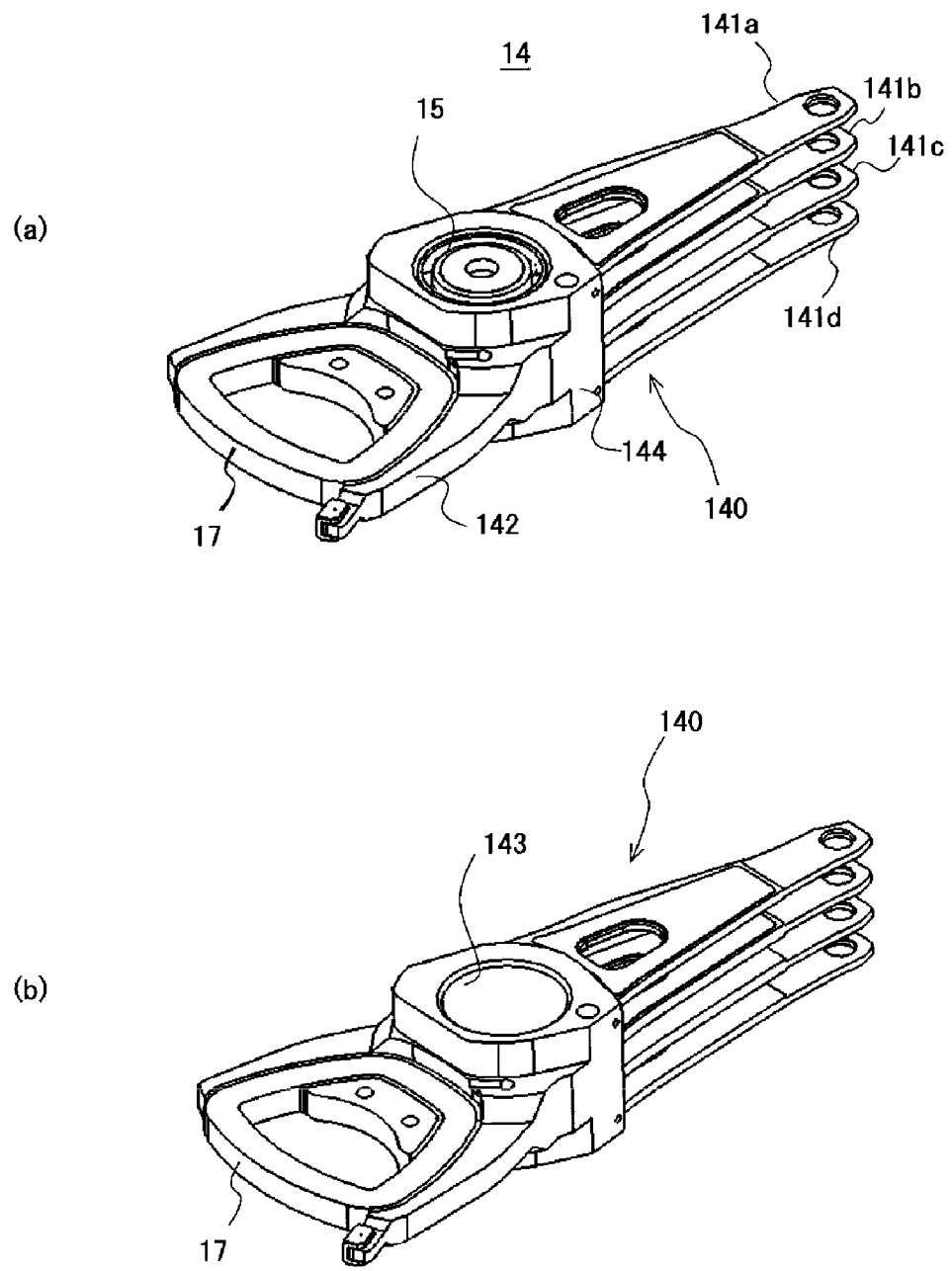
FIGS. 2(a) and 2(b) are schematic perspective views illustrating the component parts of the actuator, in accordance with an embodiment of the present invention.

In accordance with embodiments of the present invention, FIG. 2(a) is a schematic perspective view illustrating the assembly of a carriage 140 and the pivot-bearing assembly 15 of this embodiment; and, FIG. 2(b) is a schematic perspective view illustrating the carriage 140 alone. In this example configuration, the carriage 140 includes four arms 141a to 141d, a pivot support portion 144, and a coil arm 142. The hole 143 in which the pivot-bearing assembly 15 is housed is formed between the arms 141a to 141d and the coil arm 142 for supporting the VCM coil 17. The pivot-bearing assembly 15 is inserted in the hole 143, and is affixed to the carriage 140 by means of an adhesive. The rotation of the pivot-bearing assembly 15 causes the carriage 140 to oscillate about the center of a rotary shaft of the pivot-bearing assembly 15.

The pivot support portion 144 of the center of the carriage 140 in which the hole 143 is formed, the arms 141a to 141d, and the coil arm 142 are continuously and integratedly fabricated from the same material. In an embodiment of the present invention, the carriage 140, in order to reduce the weight of the carriage 140, is fabricated from an aluminum alloy or magnesium alloy. Typically, the carriage 140 is manufactured by molding and machine processing a metal material. One or two HGAs are coupled to the front edge of each of the arms 141a to 141d by, for example, swaging. The VCM coil 17 is normally affixed to the inner circumferential side of the coil arm 142 surface by means of an adhesive.

Figure 3:
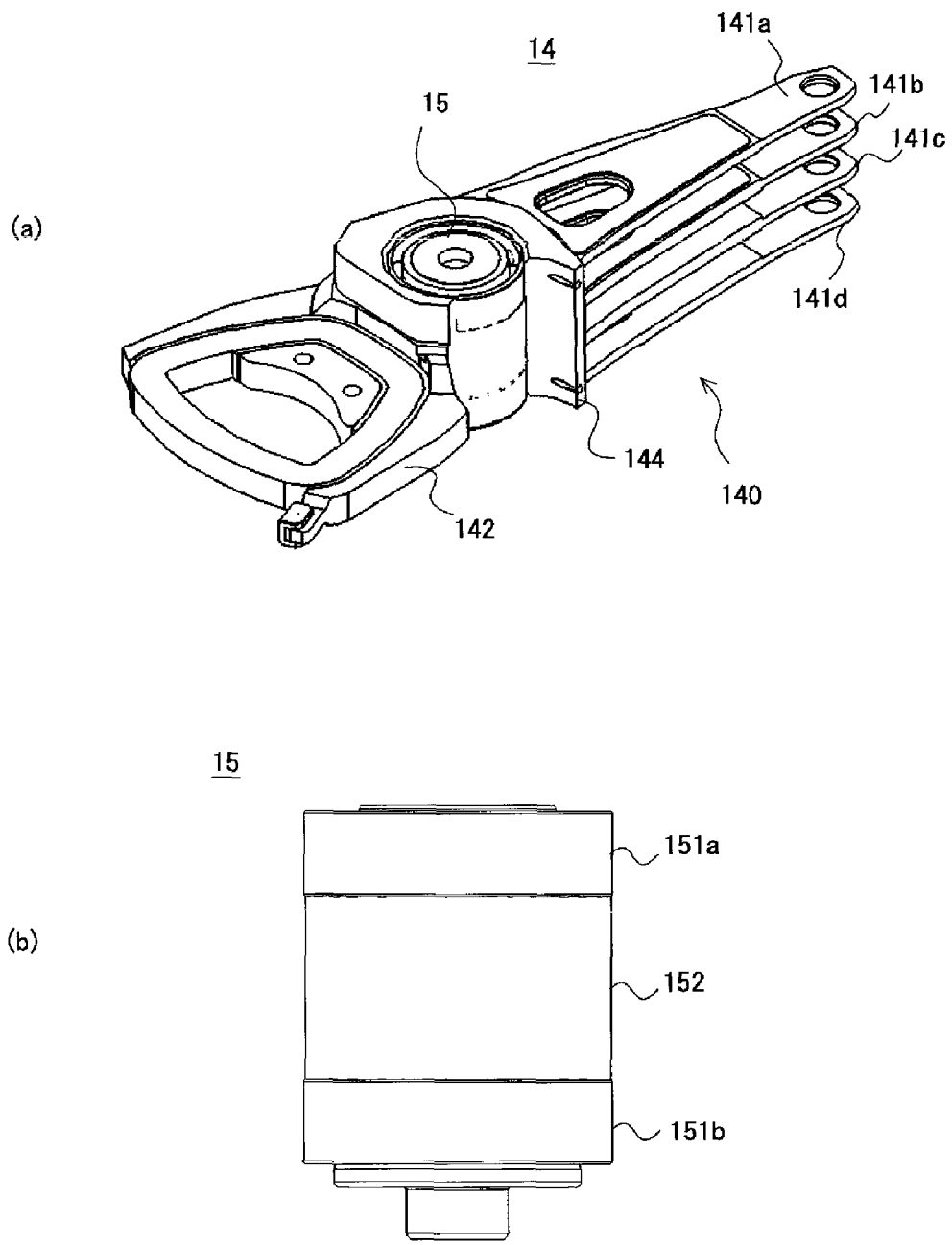
FIGS. 3(a) and 3(b) are a schematic cut-away perspective view and a side view, respectively, illustrating a pivot-bearing assembly mounted in the actuator, in accordance with an embodiment of the present invention.

In accordance with embodiments of the present invention, FIG. 3(a) is a diagram of the assembly of the carriage 140 and the pivot-bearing assembly 15 in which a portion of the pivot support portion 144 is shown as being cut away, while FIG. 3(b) is a side view illustrating the pivot-bearing assembly 15. The pivot-bearing assembly 15, in order to increase rigidity of the pivot-bearing assembly 15, is fabricated from a bearing steel or stainless steel. Although an adhesion inhibitor and an adhesive are coated onto the outer circumferential surface of the pivot-bearing assembly 15 when the pivot-bearing assembly 15 is affixed in the hole 143, this is not shown in the drawing. The pivot-bearing assembly 15 includes two bearings 151a and 151b.

The upper bearing 151a and lower bearing 151b are stacked in the direction of the pivot shaft, which is also referred to herein as the vertical direction. A spacer 152 is arranged between the upper bearing 151a and the lower bearing 151b. The bearings 151a and 151b are able to rotate about the pivot shaft. The bearings 151a and 151b are ball bearings. Although the spacer 152 is sandwiched by the bearings 151a and 151b, the spacer 152 is neither securely, nor even partially, affixed to the bearings 151a and 151b.

Figure 4:
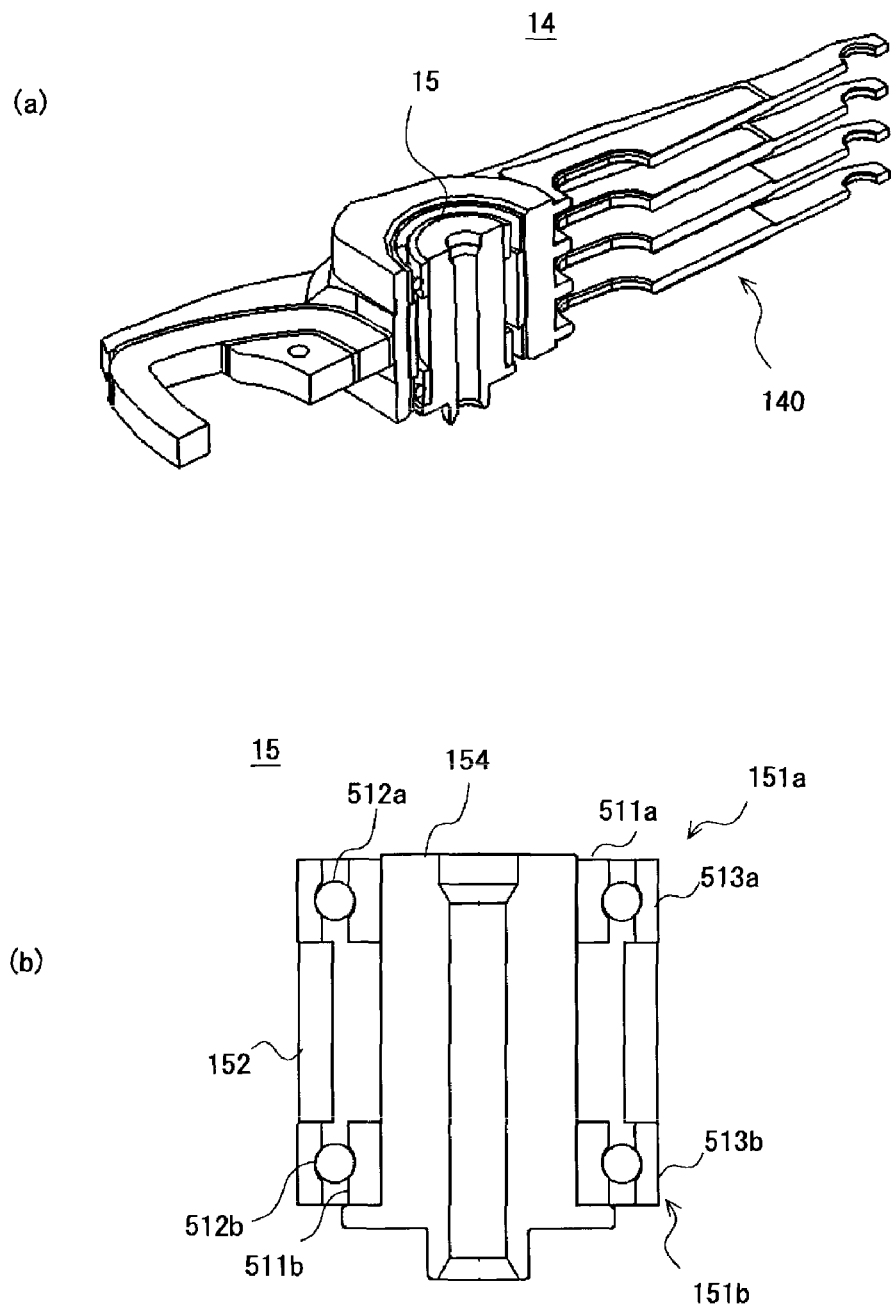
FIGS. 4(a) and 4(b) are a schematic cross-sectional perspective view and a cross-sectional view, respectively, illustrating the structure of the pivot-bearing assembly, in accordance with an embodiment of the present invention.

In accordance with embodiments of the present invention, FIG. 4(a) is a cross-sectional view of the assembly of the carriage 140 and the pivot-bearing assembly 15; and, FIG. 4(b) is a cross-sectional view of the pivot-bearing assembly 15. In one configuration of the pivot-bearing assembly 15 as shown in FIG. 4(b), the upper bearing 151a and lower bearing 151b have the same structure, but with inverse orientation. The configuration of the upper bearing 151a is next described. The upper bearing 151a includes an inner ring 511a, a ball bearing 512a, and an outer ring 513a. FIG. 4(b) shows only two of the plurality of ball bearings, only one of which is denoted by a symbol.

The inner ring 511a is affixed to a center fixed shaft 154, and does not move with respect to the fixed shaft 154. The ball bearing 512a is supported between the inner ring 511a and the outer ring 513a in a state in which a preload is applied to the ball bearing 512a. The rotation of the ball bearing 512a affords the relative rotation of the outer ring 513a with respect to the inner ring 511a, and the fixed shaft 154.

The lower bearing 151b includes an inner ring 511b, a ball bearing 512b, and an outer ring 513b. The manner in which the symbols are assigned to the lower bearing 151b is the same as for the upper bearing 151a. The lower bearing 151b operates in the same way as the upper bearing 151a. The spacer 152 is enclosed between the outer rings 513a and 513b of the bearings 151a and 151b respectively in a state in which pressure is applied to the bearings 151a and 151b in the vertical direction. Usually, although the outer rings 513a and 513b and spacer 152 rotate integrally, the outer rings 513a and 513b and spacer 152 are not securely affixed and, accordingly, are able to be independently rotated.

Figure 5:
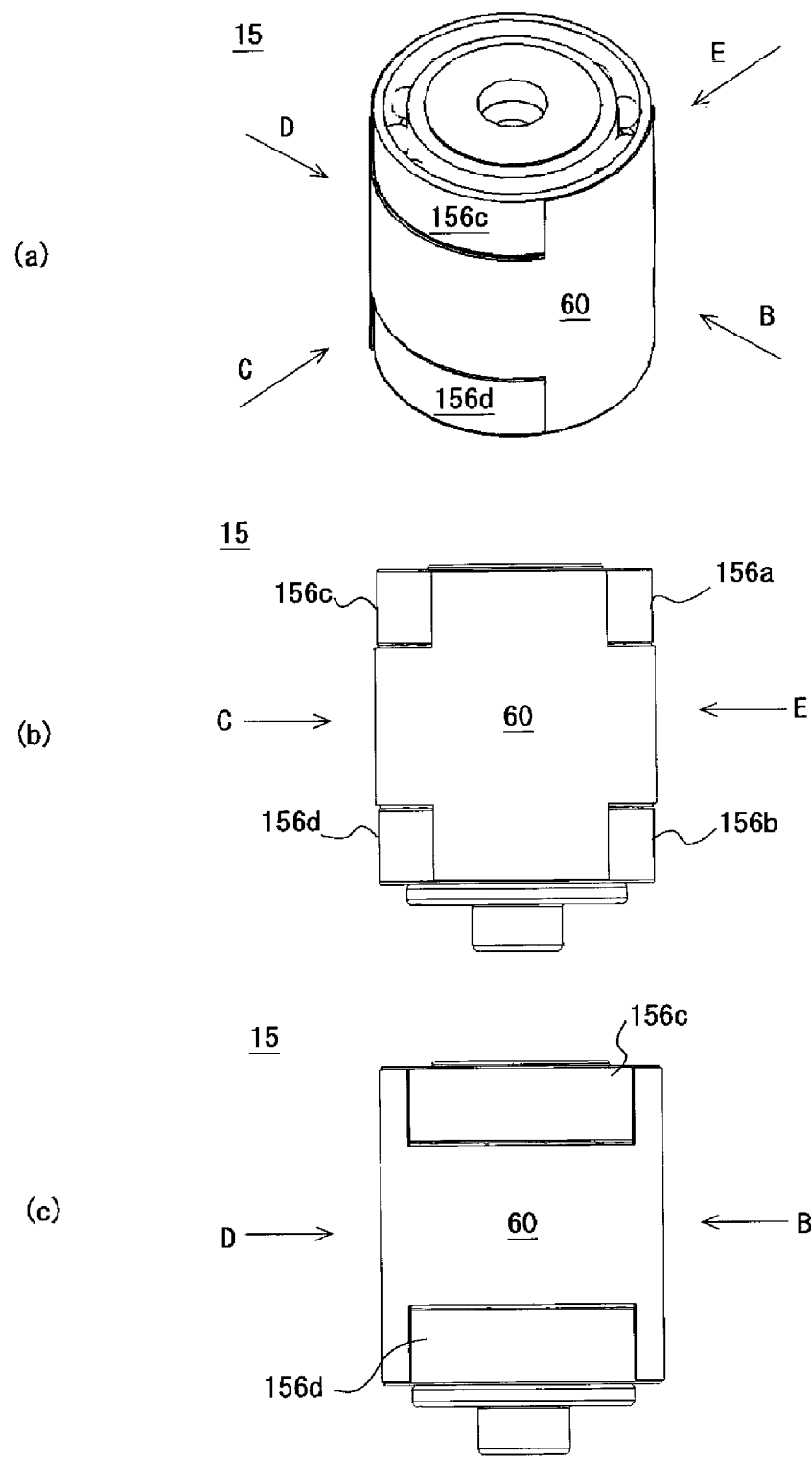
FIGS. 5(a), 5(b) and 5(c) are a schematic perspective view, two side views, respectively, illustrating the coated region of the adhesion inhibitor on the outer circumferential surface of the pivot-bearing assembly, in accordance with an embodiment of the present invention.

The actuator 14 of this embodiment of the present invention is characterized by the pivot-bearing assembly 15 being affixed by means of an adhesive to the inner surface of the hole 143 formed in the carriage 140. The actuator 14 is further characterized by the use of an adhesion inhibitor to control the region of adhesion of the adhesive. FIG. 5(a) to FIG. 5(c) schematically show a pivot-bearing assembly 15 whose outer circumferential surface is coated with an adhesion inhibitor 60.

In accordance with embodiments of the present invention, FIG. 5(a) is a perspective view of the pivot-bearing assembly 15; FIG. 5(b) is a side view of the pivot-bearing assembly 15 as seen from the direction shown by the arrow B of FIG. 5(a); and, FIG. 5(c) is a side view of the pivot-bearing assembly 15 as seen from the direction shown by the arrow C of FIG. 5(a). The arrows B, C are perpendicular to the pivot shaft, which are oriented parallel to the recording surface of the magnetic-recording disk 12; and the arrows B and C are also mutually perpendicular to one another. The arrow D is parallel and oppositely oriented to the arrow B, and the arrow E is parallel and oppositely oriented to the arrow C. The side view of the pivot-bearing assembly 15 in the direction shown by the arrow D is the same as in the direction shown by the arrow B, while the side view of the pivot-bearing assembly 15 in the direction shown by the arrow E is the same as in the direction shown by the arrow C.

An adhesive is adhered to the side of the pivot-bearing assembly 15 on the outer side of a region of the pivot-bearing assembly 15 on which the adhesion inhibitor 60 is coated. In one embodiment of the present invention, an adhesive curable without air is used. The adhesive includes metal oils, and cures in the absence of air. In other words, the adhesive cures in narrow regions where the adhesive makes contact with metals. Since adhesives curable without air are widely used, a description of the specific composition of the adhesive used in this embodiment of the present invention is known in the art.

Provided the adhesion inhibitor 60 is a material with the capacity to inhibit the adhesion afforded by an adhesive, any appropriate material in respect of the employed adhesive is able to be used. In another embodiment of the present invention, the adhesion inhibitor 60 is a material having a water-repellent action and/or oil-repellent action, which herein is also referred to as a water-repellent/oil-repellent agent. Many water-repellent/oil-repellent agents are known in the art. Depending on the adhesive material employed, designers may select a resin material having one or both of a water-repellent action and/or an oil-repellent action. Of these, fluoride-based water-repellent/oil-repellent agents are utilized in an embodiment of the present invention, because, if a silicon-based material is used, there is a risk of the silicon infiltrating the head/disk interface, and the ceramic-forming silicon causing damage to the magnetic-recording disk and the head-slider.

Figure 6:
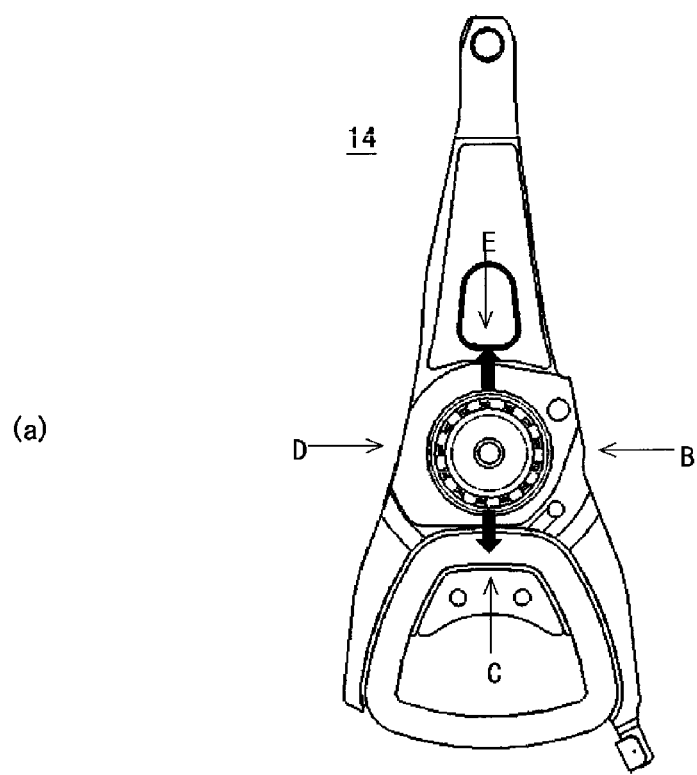
FIGS. 6(a) and 6(b) are a schematic plan view and a diagram illustrating the relationship between the tensile force and the region of adhesion, and conversely the region of non-adhesion, of the pivot-bearing assembly, in accordance with an embodiment of the present invention.
Figure 6:
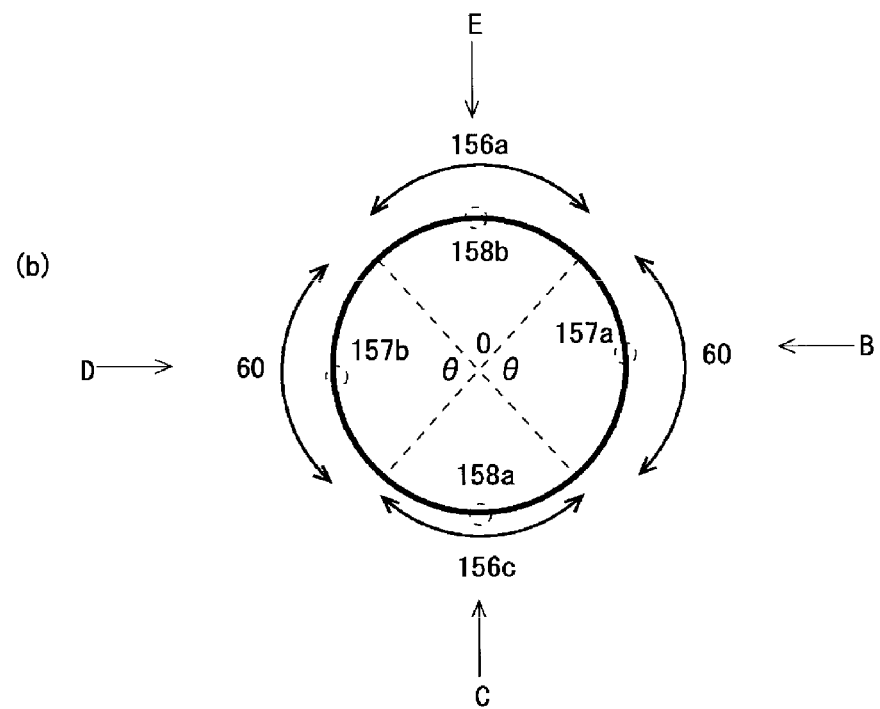

In accordance with embodiments of the present invention, FIG. 6(a) is a plan view illustrating the relationship of the pivot-bearing assembly with the actuator 14 in the direction of the arrows B to E of FIG. 5(a). The arrows B and D are oriented in a direction parallel to the oscillation direction, which is also referred to herein as the left-right direction, of the actuator 14 along a line that passes through the center of the pivot shaft. Accordingly, in accordance with embodiments of the present invention, FIG. 5(b) describes a view of the right side of the pivot-bearing assembly 15. The arrows C and E are oriented parallel to the longitudinal direction, which is also referred to herein as the front-rear direction, of the actuator 14; and, the arrow C points from the rear to the front of the actuator 14. More precisely, the arrows C and E lie along a line connecting the center of the pivot shaft and the head-slider 13. In accordance with embodiments of the present invention, FIG. 5(c) describes a view of the rear side of the pivot-bearing assembly 15.

In one example configuration as shown in FIG. 5(a) to FIG. 5(c), four separate regions of adhesion 156a to 156d are formed in the outer circumferential surface of the pivot-bearing assembly 15. The regions of adhesion 156a to 156d are separated by regions coated with the adhesion inhibitor 60, which are also referred to herein as adhesion-inhibited regions. Although the adhesion-inhibited region of this configuration provides a single continuous region, a plurality of separate adhesion-inhibited regions may be formed.

The regions of adhesion 156a and 156b are formed in the front side, which is also referred to herein as the head-slider side, of the pivot-bearing assembly 15, and the regions of adhesion 156c, 156d are formed in the rear side, which is also referred to herein as the VCM-coil side. To put this another way, the adhesion inhibitor 60 extends to cover from the upper end to the lower end of left/right regions of the sides of the pivot-bearing assembly, and the pivot-bearing assembly 15 is not bonded to the carriage 140 at these left/right regions. In this way, the pivot-bearing assembly 15 is bonded to the carriage 140 at the front and rear, but is not bonded to the carriage 140 at the left/right regions.

The manufacture of the actuator 14 includes coating an adhesive on the pivot-bearing assembly 15 and/or the carriage 140, inserting the pivot-bearing assembly 15 in the hole 143 of the carriage 140, and then curing the adhesive. In one method of the manufacture of the actuator 14, the adhesive is coated on a region on the inner-side surface of the hole 143 corresponding to lower regions of adhesion 156b and 156d, and the adhesive is coated on upper regions of adhesion 156a and 156b of the pivot-bearing assembly 15. Accordingly, the pivot-bearing assembly 15 and carriage 140 are able to be efficiently, securely affixed across precise regions. This method is applied in the same way to another example configuration described below.

A rise in temperature causes both the carriage 140 and the pivot-bearing assembly 15 to expand, while a drop in temperature causes both to contract. The carriage 140 is fabricated from an aluminum alloy or magnesium alloy, and if the pivot-bearing assembly 15 is fabricated from a bearing steel or stainless steel, the coefficient of linear expansion of the carriage 140 is greater than the coefficient of linear expansion of the pivot-bearing assembly 15. Accordingly, a rise in temperature causes the carriage 140 to pull the pivot-bearing assembly 15 toward the outer circumferential side at the regions of adhesion 156a to 156d.

A preload is applied to the balls within the bearings 151a and 151b of the pivot-bearing assembly 15. When this preload drops, the rigidity of the bearings 151a and 151b increases markedly, and vibration characteristics of the actuator 14 deteriorate markedly. When the bearings 151a and 151b are pulled toward the outer side as a result of a rise in temperature, the preload applied to the bearings 151a and 151b decreases. The drop in the rigidity of the bearings 151a and 151b caused by this decrease in preload, along with the deterioration in vibration characteristics of the actuator 14 attributable to the drop in the rigidity of the bearings 151a and 151b, possess directionality. The rigidity of the bearings 151a and 151b in the direction of the tensile force drops markedly and, furthermore, the vibration characteristics in this direction deteriorate markedly.

In the aforementioned configuration, the regions of adhesion 156a to 156d are fabricated in the front/rear regions of the bearings 151a and 151b alone, and are not fabricated in the left/right regions. As a result, the thermal deformation produced by the rise in temperature principally includes a tensile force applied in the front-rear direction of the bearings 151a and 151b (designated by the black arrow in FIG. 6(a)), and little tensile force is applied in the left/right direction. Accordingly, the deterioration in the actuator vibration characteristics 14 in the oscillation direction, which is substantially in the radial direction of the magnetic-recording disk, is able to be suppressed to a minimum. The actuator 14, as a result of the oscillation operation of the actuator 14, positions the head-slider 13 in substantially the radial direction of the magnetic-recording disk, which substantially oriented along the oscillation direction. Suppression of the deterioration in vibration characteristics of the actuator 14 in the oscillation direction affords a suppression of the deterioration in positional precision caused by temperature change.

To suppress the deterioration in vibration characteristics of the actuator 14 which causes deterioration in positional precision in this way, the oscillation direction component of the tensile force produced by the thermal deformation of the actuator 14 is made as small as possible. As is able to be understood from this description, the regions of adhesion extend in the circumferential direction of the bearing outer circumferential surface. The position of the regions of adhesion in the circumferential direction is next described with reference to FIG. 6(b).

In accordance with embodiments of the present invention, FIG. 6(b) schematically shows the regions of adhesion 156a and 156c as seen from above the pivot-bearing assembly 15. In an embodiment of the present invention, in terms of vibration characteristics, the regions of adhesion 156a and 156b are aligned in the vertical direction and have line symmetry; and, similarly, in another embodiment of the present invention, the regions of adhesion 156c and 156d have line symmetry. These conditions are satisfied in the configuration described below. In addition, in another embodiment of the present invention as shown in FIG. 6(b), in terms of the vibration characteristics, the regions of adhesion 156a and 156c have point symmetry with respect to a center, O, of the pivot shaft. This condition is satisfied in the configuration described below.

The sections 157a and 157b of the outer circumferential surface of the bearings 151a and 151b of FIG. 6(b) where the oscillation direction, which is the left-right direction in FIG. 6(b), defines a normal line are covered by the adhesion inhibitor 60 and form regions of non-adhesion. In order to reduce the tensile force component in the oscillation direction, the regions incorporating these sections 157a and 157b are coated with the adhesion inhibitor 60 to establish regions of non-adhesion.

In the example configuration of FIG. 6(b), regions described by an angle, θ, about the respective sections 157a and 157b provide regions of non-adhesion. These regions are covered by the adhesion inhibitor 60. To put this another way, regions described by an angle, 180°-θ, about the respective sections 158a and 158b where the front-rear direction of the actuator 14 defines a normal line provide regions of adhesion. Although the value of the angle, θ, may be selected as appropriate in accordance with the design of the actuator 14, in one configuration of the actuator 14, the angle, θ, is no less than 90°, and, in another embodiment of the present invention, is no less than 120°.

In one embodiment of the present invention, as is shown in the example configuration illustrated in FIGS. 5(a) to (c), the outer circumferential surface of the spacer 152 is covered by the adhesion inhibitor 60 so as to provide a region of non-adhesion. Although the spacer 152 of the pivot-bearing assembly 15 separates the bearings 151a and 151b and urges the bearings 151a and 151b in the shaft direction, the spacer 152 is not fully affixed, in other words, bonded, to the bearings 151a and 151b. This is because extending the regions of adhesion from the bearings 151a and 151b to the spacer 152 will have an effect on the operation of the pivot-bearing assembly 15 and result in a deterioration in the vibration characteristics.

In the example configuration described above, regions of adhesion 156a to 156d extend from the upper end to the lower end of the outer circumferential surface of the bearings 151a and 151b. However, a portion of the outer circumferential surface of the bearings 151a and 151b may be covered in the shaft direction in such a way that the regions of adhesion 156a to 156d lie in the circumferential direction. For example, in the example configuration described above, the adhesion-inhibiting regions between the regions of adhesion 156a and 156b and the adhesion-inhibiting regions between the regions of adhesion 156c, 156d extend from the upper side and the lower side, and only a portion of the regions of adhesion 156a to 156d is covered with the adhesion inhibitor 60. The length of the regions of adhesion 156a to 156d is reduced in the shaft direction, which is a direction oriented vertical, perpendicular, to the surface of the magnetic-recording disk 12.

In an embodiment of the present invention, the regions of adhesion 156a to 156d extend to the upper end or lower end of the outer circumferential surface of the pivot-bearing assembly 15, which is the upper end of bearing 151a and the lower end of bearing 151b. This allows for the adhesion inhibitor 60 and adhesive to be more easily coated which affords an increased manufacturing efficiency. In addition, in another embodiment of the present invention, as is the case in the configuration described above, regions of adhesion are formed in both the front and rear of the bearings 151a and 151b; and, in an embodiment of the present invention, regions of adhesion are formed in the outer circumferential surface of both bearings 151a and 151b.

Figure 7:
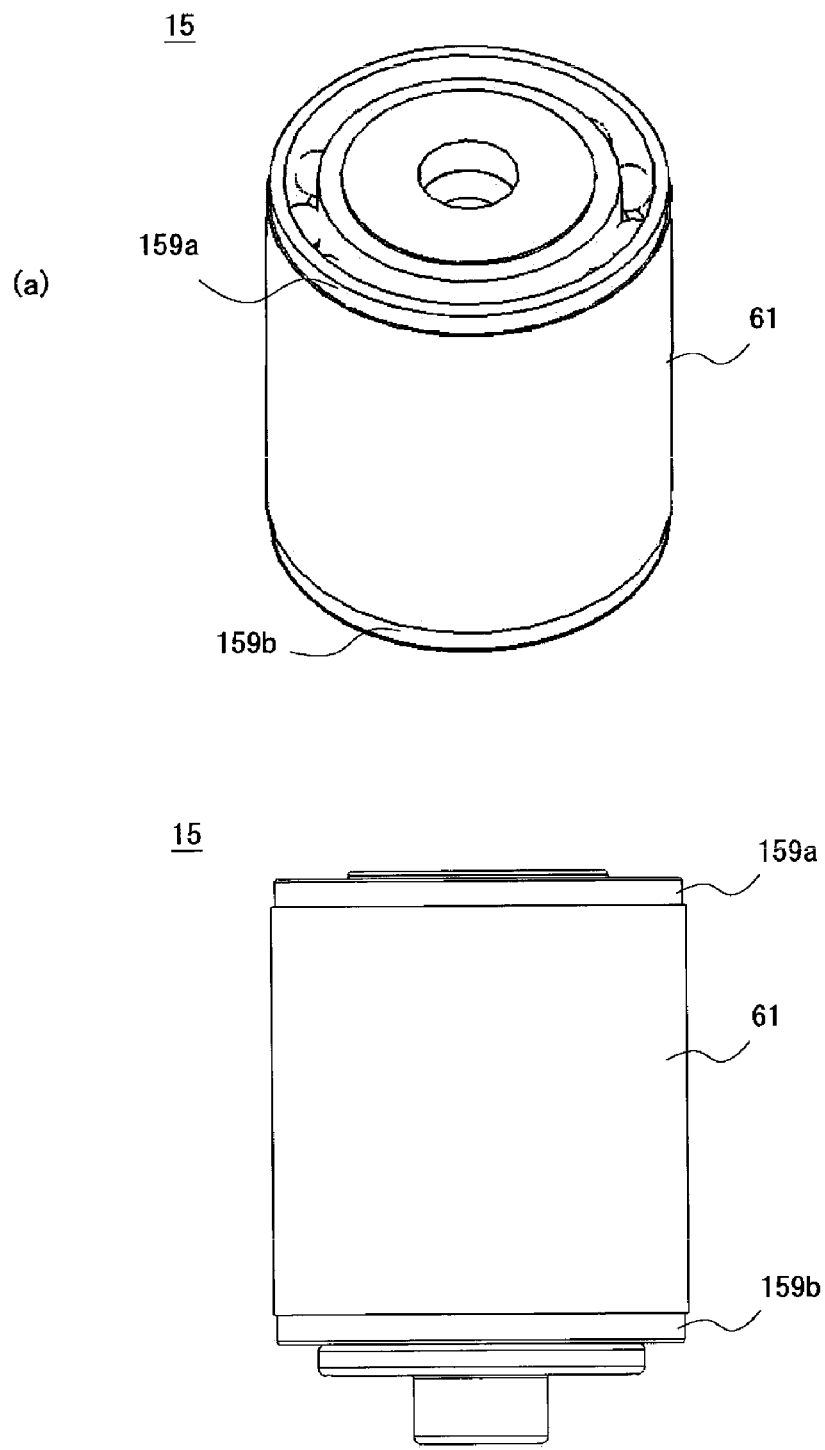
FIGS. 7(a) and 7(b) are a schematic perspective view and a side view, respectively, illustrating the region of adhesion of the adhesion inhibitor on the outer circumferential surface of the pivot-bearing assembly in another example configuration, in accordance with an embodiment of the present invention.

Another example of the adhesion-inhibiting regions and the regions of adhesion is next described. In accordance with embodiments of the present invention, FIG. 7(a) is a perspective view of a pivot-bearing assembly 15 coated with an adhesion inhibitor 61; and, FIG. 7(b) is a side view of the pivot-bearing assembly 15 coated with an adhesion inhibitor 61. In this configuration, regions of adhesion 159a and 159b are formed above and below the adhesion inhibitor 61 on the outer circumferential surface of the pivot-bearing assembly 15. The adhesion inhibitor 61 covers the outer circumferential surface of the pivot-bearing assembly apart from the upper end region and lower end region of the outer circumferential surface of the pivot-bearing assembly. This differs from the other configuration described with reference to FIG. 5 in that the length in which the adhesion inhibitor 61 extends in the vertical direction is constant.

The regions of adhesion 159a and 159b extend fully around the outer circumferential surface of the pivot-bearing assembly, and the angle, θ, of the regions of adhesion 159a and 159b as described with reference to FIG. 6(b) is 360°. The length in which each of the regions of adhesion 159a and 159b extend in the vertical direction is constant. The adhesion inhibitor 61 and the regions of adhesion 159a and 159b describe the same shape in each side view from each direction. In an embodiment of the present invention, similarly to the relationship between the regions of adhesion 156a and 156b, the regions of adhesion 159a and 159b display shape symmetry, which is the same shape in this configuration.

Thus, in accordance with embodiments of the present invention, this configuration provides for ease of adhesive coating. The adhesive is coated on the upper end region and lower end region of the outer circumferential surface of the pivot-bearing assembly; and, accordingly, the adhesive is able to be easily coated and, in turn, the manufacturing efficiency is increased. Here, in accordance with embodiments of the present invention, the regions of adhesion 159a and 159b extend across the circumference; and, using a method that differs from that employed for the previously described other example configuration, in accordance with embodiments of the present invention, a drop in the preload caused by the tensile force is suppressed. In this configuration, the regions of adhesion 159a and 159b are established in such a way that the tensile force is applied to the outer rings 513a and 513b in the direction appropriate to match the direction of preload on the bearings 151a and 151b. Accordingly, a drop in preload caused by the tensile force is suppressed.

Figure 8:
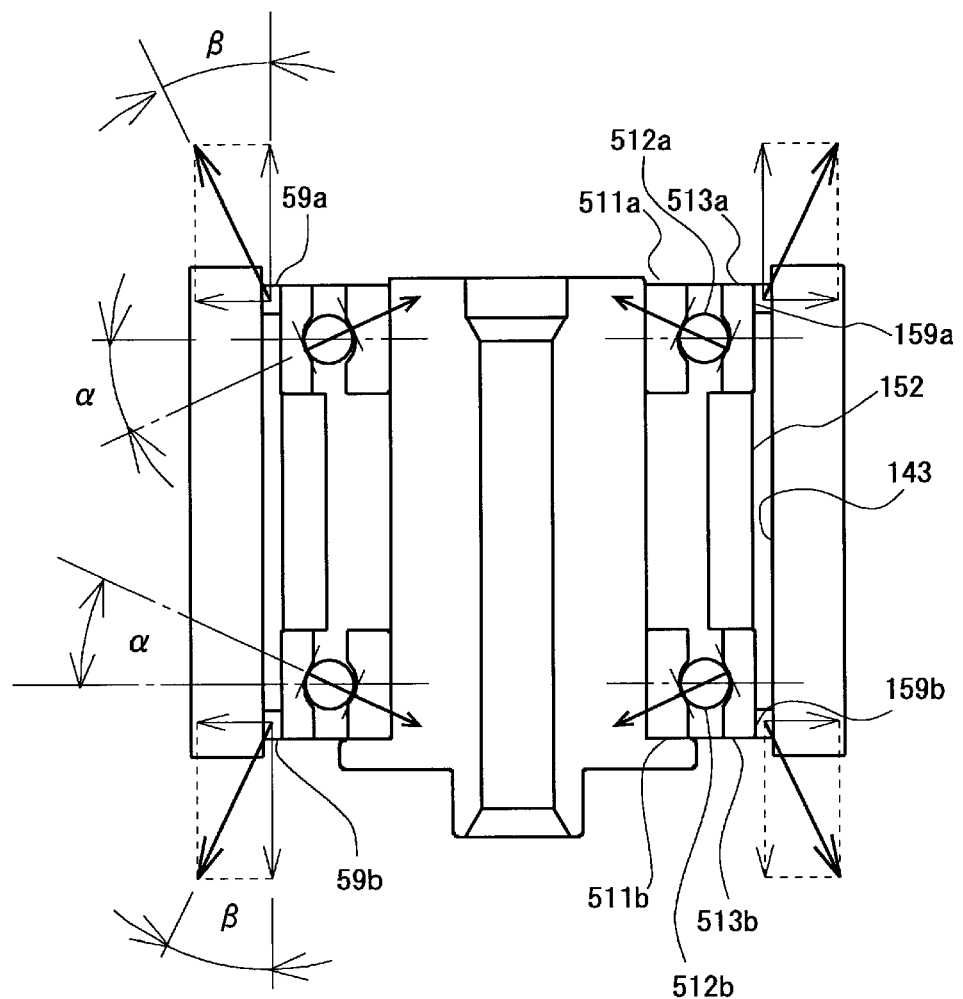
FIG. 8 is schematic cross-sectional view illustrating the relationship between the tensile force and region of adhesion, and conversely the region of non-adhesion, of the pivot-bearing assembly in another example configuration, in accordance with an embodiment of the present invention.

In accordance with embodiments of the present invention, FIG. 8 is a schematic cross-sectional view of a portion of the pivot-bearing assembly 15 and the carriage 140 of this configuration. The spacer 152, by way of the outer rings 513a and 513b, applies a preload to the balls 512a and 512b of the bearings 151a and 151b respectively. The arrows of the balls 512a and 512b indicate the direction of preload on the outer rings 513a and 513b. The angle, α, defines the contact angle between the balls 512a and 512b and the outer rings 513a and 513b. The contact angle between the balls 512a and 512b and the inner ring is also defined by α.

Adhesives 59a and 59b are coated on the regions of adhesion 159a and 159b. The tensile force on the outer rings 513a and 513b is exerted on the regions of adhesion 159a and 159b. The outer rings 513a and 513b expand in both the axial direction and a diametral direction. The direction of tensile force constitutes a direction arrived at as a composite of these two direction components, and is the direction shown by the arrow of FIG. 8. The effect of the tensile force on the preload is maximally reduced when the direction of tensile force and the direction of preload are perpendicular. Accordingly, the effect of the tensile force on the preload is maximally reduced when an angle, β, between the tensile force and the axial direction is equivalent to the contact angle, α. In an embodiment of the present invention, the pivot-bearing assembly 15 and the regions of adhesion 159a and 159b are designed in such a way as to establish this relationship.

The angle of the tensile force is dependent upon both the position and the magnitude of the regions of adhesion 159a and 159b. Although, from the standpoint of manufacturing efficiency, in another embodiment of the present invention, the regions of adhesion extend to the upper end or the lower end as is the case for the regions of adhesion 159a and 159b of FIG. 8, the regions of adhesion may be formed in positions away from the upper end or lower end. In this instance, three isolated regions of non-adhesion in the shaft direction are formed. Furthermore, although, from the standpoint of manufacturing efficiency, only a single region of adhesion is formed in each of the bearings 151a and 151b, a plurality of isolated regions of adhesion in the shaft direction may be formed in each of the bearings 151a and 151b.

In an embodiment of the present invention, as is described above, although the angle between the direction of tensile force and the direction of preload is 90°, displacement of the direction of tensile force from the direction of preload minimizes the effect of the direction of tensile force on the direction of preload. In another embodiment of the present invention, in order to practically reduce the effects of tensile force on the preload, the angle between the direction of tensile force and the direction of preload, which is an angle defined as between 0° to 90°, is no less than 45°; and, in another embodiment of the present invention, the angle between the direction of tensile force and the direction of preload is no less than 60°.

As is described with reference to the previously-described two example configurations, in another embodiment of the present invention, the region of the outer circumferential surface of the pivot-bearing assembly 15 excluding the regions of adhesion is coated with an adhesion inhibitor. This is because the adhesion inhibitor readily and effectively affords the formation of regions of non-adhesion. However, this also pertains to embodiments of the present invention in respect of the use of an adhesion inhibitor to control the regions of adhesion. Accordingly, where expansion of the adhesive is able to be prevented by an adhesion inhibitor or by the shape of the outer circumferential surface, some of the regions of non-adhesion are not covered by an adhesion inhibitor.

In the previously-described two examples, the bearings 151a and 151b are directly bonded to the inner circumferential surface of the hole 143 of the carriage 140 by means of an adhesive. In one embodiment of the present invention, this configuration provides for increasing the rigidity of the actuator 14. However, in a configuration including a sleeve between the bearings 151a and 151b and the inner circumferential surface of the hole 143, the adhesion method based on the use of an adhesion inhibitor of the embodiment of the present invention may be employed. Here, the pivot-bearing assembly 15 is bonded by way of the sleeve to the carriage 140.

If the sleeve is fabricated from a material the same as the material from which the outer rings 513a and 513b are constituted, the adhesion method of the embodiment of the present invention is used between the sleeve and the inner circumferential surface of the hole 143; while if the sleeve is constituted from a material the same as that from which the carriage 140 is constituted, this adhesion method is used between the sleeve and the bearings 151a and 151b. If the sleeve is fabricated from a material that differs from the materials from which both these components are constituted, the adhesion method of the embodiments of the present invention may be used in one or both of the ways described above.

Although certain embodiments of the present invention are described above, the embodiments of the present invention are not restricted to the embodiments of the present invention described above. Accordingly, the elements of the embodiments described above may be altered or modified within the scope and spirit of the embodiments of the present invention. For example, the embodiments of the present invention are not limited to a HDD and may have application in disk drives that use other types of disk. Furthermore, for example, provided the adhesion inhibitor is able to inhibit the adhesion produced by an adhesive, the adhesion inhibitor is not restricted to a water-repellent/oil-repellent adhesion inhibitor, and a hydrophilic, or alternatively, a liophilic, material may be used.

In another embodiment of the present invention, from the standpoint of vibration characteristics, the oscillation operation, and the simplicity of the structure, the pivot-bearing assembly includes two bearings separated in the shaft direction. However, the adhesion method of this embodiment may also be applied to a pivot-bearing assembly having one bearing, or three or more bearings. In addition, in the pivot-bearing assembly, a spacer may be securely affixed in such a way as to always rotate simultaneously with bearings disposed about the spacer.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive with adhesively bonded pivot-bearing assembly, said disk drive comprising:
    a head for accessing a disk;
    a suspension for supporting said head;
    a carriage coupled to said suspension;
    a pivot-bearing assembly housed in a hole of said carriage that is configured to rotate in such a way that said carriage is configured to oscillate;
    an adhesive between said pivot-bearing assembly and an inner circumferential surface of said hole for bonding said pivot-bearing assembly with said carriage; and
    an adhesion inhibitor disposed on the same surface as said adhesive for controlling a region of adhesion wherein said adhesion inhibitor is an agent that repels said adhesive selected from the group consisting of a fluoride-based water-repellent agent, a fluoride-based oil-repellent agent, and a combination of a fluoride-based water-repellent agent and a fluoride-based oil-repellent agent.

2. The disk drive of claim 1, wherein said adhesive bonds a bearing outer ring of said pivot-bearing assembly to an inner circumferential surface of said hole.

3. The disk drive of claim 2, wherein said pivot-bearing assembly comprises:
    at least two bearings disposed in a shaft direction,
    an outer ring of an upper bearing and an inner circumferential surface of said hole are bonded at an upper region of adhesion;
    an outer ring of a lower bearing and an inner circumferential surface of said hole are bonded at a lower region of adhesion separate from said upper region of adhesion; and
    wherein said upper region of adhesion extends to an upper end of said pivot-bearing assembly, while said lower region of adhesion extends to a lower end of said pivot-bearing assembly.

4. The disk drive of claim 3, wherein said upper region of adhesion and said lower region of adhesion extend across an outer circumferential surface of said pivot-bearing assembly.

5. The disk drive of claim 4, wherein a coefficient of linear expansion of said outer ring is less than a coefficient of linear expansion of said carriage,
    and an angle between a direction of tensile force and a direction of preload of said bearing in said region of adhesion produced by a rise in temperature is no less than 45°.

6. The disk drive of claim 2, wherein a coefficient of linear expansion of said outer ring is less than a coefficient of linear expansion of said carriage,
    and an angle between a direction of tensile force and a direction of preload of said bearing in said region of adhesion produced by a rise in temperature is no less than 45°.

7. The disk drive of claim 6, wherein a region of adhesion at which said outer ring and an inner circumferential surface of said hole are bonded extends across an outer circumferential surface of said outer ring.

8. The disk drive of claim 1, wherein a region of an outer circumferential surface of said pivot-bearing assembly incorporating a section where a direction of oscillation defines a normal line constitutes a region of non-adhesion, and a region of an outer circumferential surface of said pivot-bearing assembly incorporating a section where a line connecting said head and a center of a pivot shaft defines a normal line constitutes a region of adhesion.

9. The disk drive of claim 1, wherein said pivot-bearing assembly comprises a spacer disposed between two bearings disposed in a shaft direction, and an outer circumferential surface of said spacer is covered by said adhesion inhibitor.

10. A pivot-bearing assembly, comprising:
    at least two bearings disposed in a shaft direction,
    an outer ring of an upper bearing and an inner circumferential surface of a hole are bonded at an upper region of adhesion;
    an outer ring of a lower bearing and an inner circumferential surface of said hole bonded at a lower region of adhesion separate from said upper region of adhesion; and
    wherein an adhesive is disposed between a pivot-bearing assembly and said inner circumferential surface of said hole for bonding said pivot-bearing assembly with a carriage;

wherein an adhesion inhibitor is disposed on the same surface as said adhesive for controlling a region of adhesion; and wherein said upper region of adhesion extends to an upper end of said pivot-bearing assembly, while said lower region of adhesion extends to a lower end of said pivot-bearing assembly wherein a coefficient of linear expansion of said outer ring is less than a coefficient of linear expansion of said carriage, and an angle between a direction of tensile force and a direction of preload of said bearing in said region of adhesion produced by a rise in temperature is no less than 45°.

11. The pivot-bearing assembly of claim 10, wherein said upper region of adhesion and said lower region of adhesion extend across an outer circumferential surface of said pivot-bearing assembly.

* * * * *

UNITED STATES PATENT AND TRADEMARK OFFICE
CERTIFICATE OF CORRECTION

PATENT NO. : 8,363,360 B2  
APPLICATION NO. : 12/784384  
DATED : January 29, 2013  
INVENTOR(S) : Kouki Uefune et al.

Page 1 of 1

It is certified that error appears in the above-identified patent and that said Letters Patent is hereby corrected as shown below:

Title Page, Item (30) Insert:

-- (30) Foreign Application Priority Data
    05/20/2009 (JP)............2008-122599 --

Signed and Sealed this
Sixteenth Day of July, 2013

Teresa Stanek Rea
*Acting Director of the United States Patent and Trademark Office*